United States Patent [19]

Miyazaki

[11] Patent Number: 4,939,514

[45] Date of Patent: Jul. 3, 1990

[54] FOLDABLE DATA COLLECTING AND PROCESSING DEVICE

[75] Inventor: Shinichi Miyazaki, Tokyo, Japan

[73] Assignee: Seiko Instruments, Inc., Chiba, Japan

[21] Appl. No.: 286,128

[22] Filed: Dec. 19, 1988

[30] Foreign Application Priority Data

Dec. 22, 1987 [JP] Japan .................. 62-195640[U]

[51] Int. Cl.⁵ .............................................. G06F 1/00
[52] U.S. Cl. .................................... 341/22; 200/5 A; 235/145 R; 341/23; 361/398; 364/708
[58] Field of Search ............................. 341/22, 23, 31; 340/711, 712, 825.79; 400/110, 472-474, 477-479, 484, 682; 379/368; 178/17 C; 200/5 A; 235/1 D, 145 R, 146; 361/398-399; 40/388-390; 364/708, 709.1, 709.12, 709.13

[56] References Cited

U.S. PATENT DOCUMENTS

3,717,870 2/1973 Mathews et al. ................ 341/23
4,395,704 7/1983 Kishimoto et al. .............. 340/365
4,517,660 5/1985 Fushimoto et al. ............. 200/5 A

OTHER PUBLICATIONS

"Briefcase-Portable Textwriter with 100-Key Full-Sized Keyboard", Pechanek et al., IBM Tech. Bulletin, vol. 27, No. 4A.

*Primary Examiner*—Ulysses Weldon
*Attorney, Agent, or Firm*—Spensley, Horn, Jubas & Lubitz

[57] ABSTRACT

A foldable data collecting device includes a first case and a second case mutually connected in a foldable manner, and a plate hinged between the first case and the second case by an opening/closing support. A sheet-like keyboard is disposed on the surfaces of the plate and one face of each of the first case and the second case. In case a key on the plate is to be depressed, the plate is folded down toward either the first case or the second case so that the side having the key to be depressed is directed upwardly.

3 Claims, 3 Drawing Sheets

FOLDABLE DATA COLLECTING AND PROCESSING DEVICE

BACKGROUND OF THE INVENTION

1. Field of the Invention

The present invention relates to a data collecting and processing device having a keyboard, and more particularly to an improvement in such device by the provision of housing means having a first case and a second case mutually connected in a foldable manner for movement between open and folded, or closed, positions.

2. Description of the Prior Art

Conventional portable devices of this type are generally provided with a plurality of key switches arranged in a plane, as input means, with the number of switches increasing if a large number of different types of information must be inputted, such as in functional calculators. Therefore, the data collecting device requires a large number of keys. As a result, such devices require a large area for the keyboard, and become excessively large for carrying, and thereby losing a most important advantage of devices of this type.

In order to solve the above problem, one method is to reduce the size of each key, thereby to allow the number of keys to be increased for a given keyboard area. This approach has the shortcoming that the keys become so small that they are difficult to depress and may require the use of an implement, such as a pen, as the case may be, for operating the keys. A second method is to give at least some of the keys a plurality of functions. This approach has the shortcoming that it makes operation of the device undesirably complicated.

In order to circumvent such drawbacks, a foldable structure composed of a keyboard unit is known. Kishimoto. et al., U.S. Pat. No. 4,395,704, describes a foldable structure composed of a display unit and a keyboard unit which are foldably connected to be opened for use and closed for carrying.

However, portable data collecting devices designed for uses such as for taking a patron's food or drink order in a restaurant by a waiter, require more keys than do calculators. In this case, the problems described above continue to exist.

SUMMARY OF THE INVENTION

An object of the present invention is to provide a portable data collector which is small in size and light in weight.

Another object of the present invention is to provide a portable data collector which is able to increase the types of information to be inputted while retaining a small size, low weight, and convenient key size.

Still another object of the present invention is to provide a portable data collector which can prevent the inputting of information when a housing of the portable data collector is in the closed position.

The above and other objects are achieved, according to the present invention, by a foldable electronic data collecting device comprising:

housing means including a first case and a second case, each case having opposed first and second faces;

supporting means connecting the first and second cases together and forming, between the cases, a hinge permitting the cases to move relative to one another between an open position in which the cases lie side-by-side and a closed position in which the first face of the first case faces the first face of the second case;

at least one plate having two opposed faces, the plate being pivotably mounted to the supporting means and being interposed between the first case and the second case;

keyboard means for entering data into the device when the cases are in the open position, the keyboard means comprising a sheet-like keyboard member mounted on the first face of each case and composed of a plurality of keys; and display means connected for displaying data entered via the keyboard means.

Other related objects and features of the invention will be apparent from a reading of the following description of the disclosure found in the accompanying drawings and the novelty thereof pointed out in the appended claims.

DESCRIPTION OF THE PREFERRED EMBODIMENTS

An embodiment of the invention will be described below with reference to the accompanying drawings.

Figure 1:
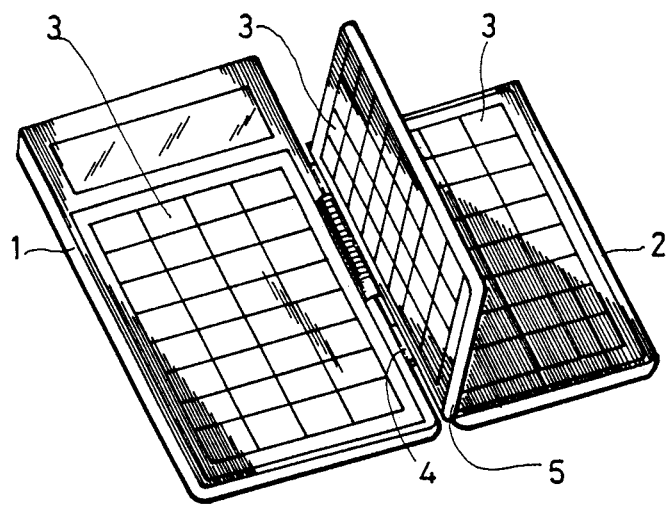
FIG. 1 is a perspective view of a portable data collector according to the present invention in the open position.

FIG. 1 is a perspective view showing one embodiment of the present device. A first case 1 and a second case 2 are hinged to each other by means of an opening/closing hinge support 4, and a plate 5 also has one edge hinged between the first case 1 and the second case 2 by the opening/closing hinge support 4 so that plate 5 can pivot about support 4. The plate 5 is made of a hard material such as a resin or plastic so that it can be pivoted toward either side, e.g., toward first case 1 or toward second case 2, around the opening/closing support 4.

Figure 2:
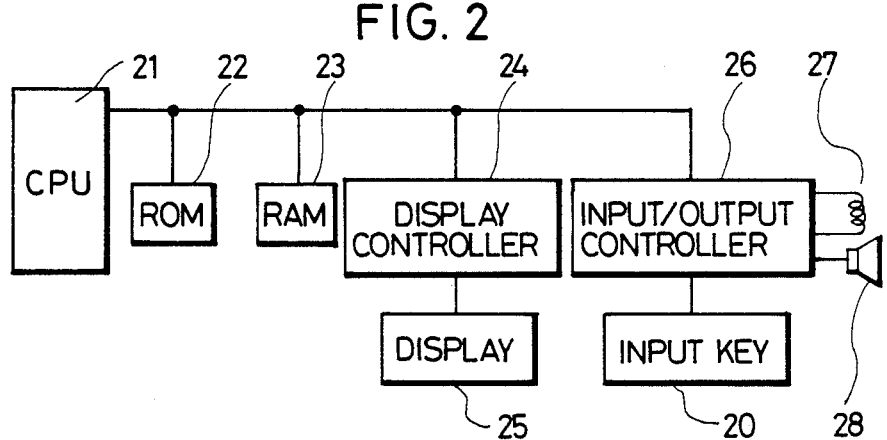
FIG. 2 is a block diagram of the circuitry provided in the portable data collector shown in FIG. 1

FIG. 2 is a block diagram of circuitry used in the portable data collector shown in FIG. 1. A CPU 21 controls the system in the portable data collector. A ROM 22 coupled with the CPU 21 stores a program for processing data therein. A RAM 32 coupled with the CPU 21 and input keys 20 stores data inputted through input keys 20 and data processed by the CPU 21. The input keys 20 is constituted by matrix keys for converting depressing pressure exerted by an operator into electrical signals. A display controller 24 receives data to be displayed from RAM 23 and provides the data to a display 25 such as an LCD or LED display. An input/output controller 26 scans the input keys 20, controls a coil 27 for transmitting data to an external apparatus and receiving data from the external apparatus, and energizes a buzzer 28. The circuit arrangement shown in FIG. 2 may be constructed according to principles known in the art.

Figure 3:
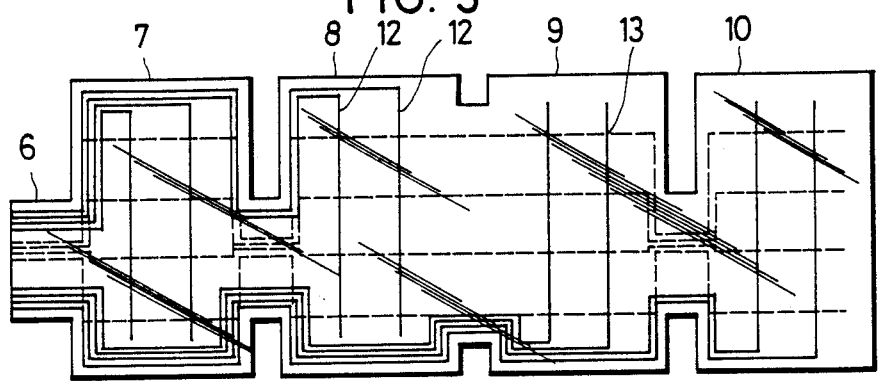
FIG. 3 is an elevational view of sheet-like keyboard component composed of two sheets used in the portable data collector shown in FIG. 1.
Figure 6:
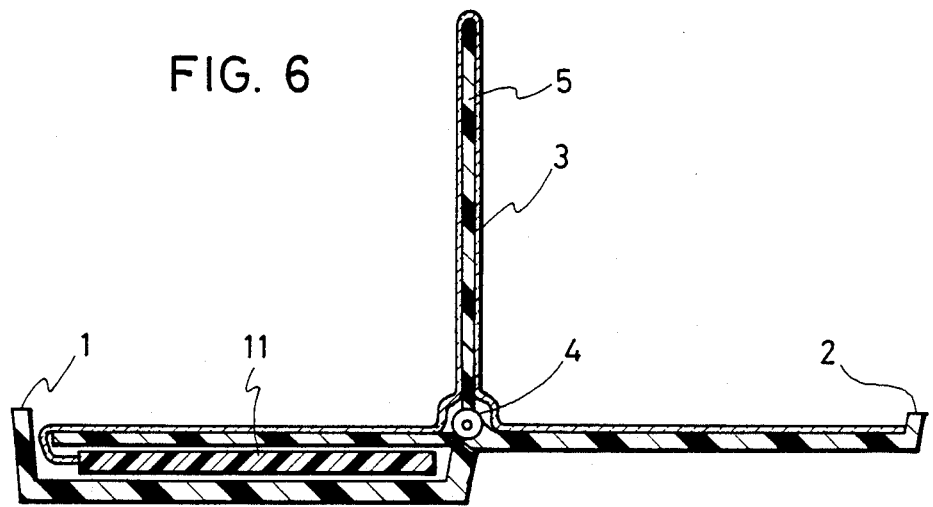
FIG. 6 is a transverse cross-sectional view of the portable data collector shown in FIG. 1 when the cover is opened.
Figure 7:
FIG. 7 is a view similar to that of FIG. 6 of the portable data collector according to the present invention when the cover is closed.

Referring to FIG. 3, the input keys are formed by a sheet-like keyboard 3 composed of keyboard portions 7, 8, 9, 10 and portions connecting the keyboard portions. Each keyboard portion 7–10 contains an array of keys. Keyboard portion 7 is mounted on, and secured to, a support surface at the interior of case 1, portions 8 and 9 are similarly mounted on respective sides of plate 5 and portion 10 is similarly mounted on the interior surface of second case 2. Two sheets bearing indicia showing the function of each are disposed between sheet-like keyboard portions 7 and 10 and their support surfaces in cases 1 and 2, respectively. Similarly, two sheet bearing indicia showing the function of keys on portions 8 and 9 are disposed between those portions and both sides of plate 5. The sheet-like keyboard 3 has a circuit interface 6 connected with a circuit block 11, as shown in FIGS. 6 and 7. Circuit block 11 contains at least units 21–24 and 26 of FIG. 2. Display 25 is mounted at the upper edge of case 1 above the part of case 1 that can be covered by plate 5. The key portion 7, the key portions 8 and 9, and the key portion 10 are held in contact on the inner side of the first case 1, the two sides of the plate 5 and the inner side of the second case 2, respectively.

Figure 4A:
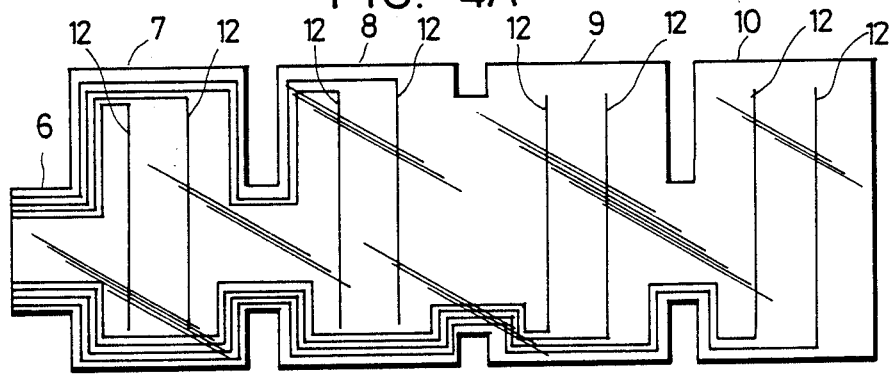
FIG. 4A is an elevational view of the upper sheet of the keyboard component shown in FIG. 3.
Figure 4B:
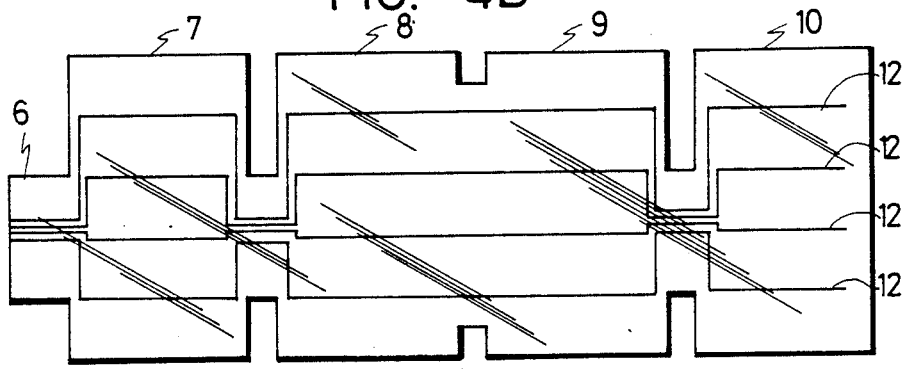
FIG. 4B is an elevational view of the lower sheet of the keyboard component shown in FIG. 3.

FIG. 4A and FIG. 4B are elevational views of the upper sheet and lower sheet, respectively, of sheet-like keyboard 3. The upper and lower sheets are wired with electrodes, or conductive line, 12 in a matrix form, and the upper sheet and lower sheet electrodes 12 have nodes 13 forming key switches. These electrodes 12 are controlled and monitored by circuit block 11.

Figure 5:
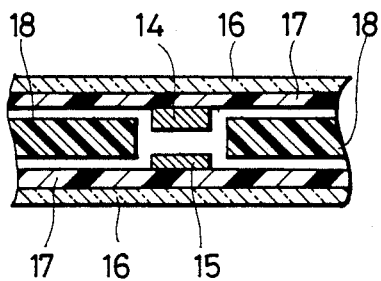
FIG. 5 is a cross-sectional view of the sheet-like keyboard component shown in FIG. 3.

FIG. 5 is a sectional view of the sheet-like keyboard 3 as shown in FIG. 3. Each keyboard sheet is composed of a protective film 16 and an insulating film 17, the upper sheet further including upper electrodes 14 disposed on insulating film 17 and the lower sheet further including electrodes 15 disposed on insulating film 17. Protective films 16 have flexibility and serve to protect insulating film 17 and electrodes 14 and 15 from external influences. A separator 18 made of an insulating member acts to separate the upper electrodes 14 from the lower electrodes 15 when external pressure is not being applied to the sheet-like keyboard 3.

Separator 18 is provided with an opening at each node 13 to permit contact to be established between conductors 14 and 15 when finger pressure is applied at that node. In addition, separator 18 can be provided at each surface with channels for receiving conductor 14 and 15. Separator 18 can be made in several parts: one part associated with each of key portions 7 and 10; and one or two parts associated key portions 8 and 9. Films 16 and 17 and separator 18 are made of transparent material to permit viewing of the underlying indicia. Conductors 14 and 15 can either be of transparent material or can be made sufficiently narrow to not obscure those indicia.

In case one key on plate 5 is to be depressed, the first case 1 and the second case 2 are opened as shown in FIG. 6, and plate 5 is pivoted down either toward the first case 1 or the second case 2 so that the side having the key to be depressed faces upwardly. At this time, keys at the downwardly facing side of plate 5 and the keys of the case 1 or 2 facing those keys are prevented from being erroneously depressed by the rigidity of the plate 5.

When second case 2 is closed onto case 1. the plate 5 is accommodated between first case 1 and second case 2, as shown in FIG. 7. In the description thus far made, the keys are mounted on both sides of plate 5. However, the keys can be mounted on only one side, and a plurality of plates 5 can be provided.

The present device can thus be constructed so that the number of keys can be easily increased with neither substantial increase in weight and size nor any reduction in individual key size and without any special processing but merely by a simple method of hinging a plate or plates between the first case and the second case by the opening/closing support.

What is claimed is:

1. A foldable electronic data collecting device comprising:
   housing means including a first case and a second case, each said case having opposed first and second faces;
   supporting means connecting said first and second cases together and forming, between said cases, a hinge permitting said cases to move relative to one another between an open position in which said cases lie side-by-side and a closed position in which said first face of said first case faces said first face of said second case;
   at least one plate having two opposed faces, said plate being pivotally mounted to said supporting means and being interposed between said first case and said second case;
   keyboard means for entering data into said device when said cases are in the open position, said keyboard means comprising a sheet-like keyboard member mounted on said first face of each said case and on each face of said plate; and
   display means connected for displaying data entered via said keyboard means.

2. A device as defined in claim 1, wherein said plate is a rigid member.

3. A device is defined in claim 1, wherein said plate is supported to be disposed between said first faces of said first case and said second case when said cases are in the closed position.

* * * * *